(12) United States Patent
Anderson

(10) Patent No.: US 6,536,824 B2
(45) Date of Patent: *Mar. 25, 2003

(54) HINGEABLY CONNECTED SIDE GATES FOR USE WITH STAKEBED VEHICLES

(76) Inventor: Raymond D Anderson, 6901 Cherry Ave., Long Beach, CA (US) 90805

( * ) Notice: Subject to any disclaimer, the term of this patent is extended or adjusted under 35 U.S.C. 154(b) by 0 days.

This patent is subject to a terminal disclaimer.

(21) Appl. No.: 09/825,681

(22) Filed: Apr. 3, 2001

(65) Prior Publication Data

US 2002/0030377 A1 Mar. 14, 2002

Related U.S. Application Data

(63) Continuation-in-part of application No. 09/655,173, filed on Sep. 5, 2000, now Pat. No. 6,325,438.

(51) Int. Cl.[7] .............................................. B62D 27/00
(52) U.S. Cl. ........................... 296/36; 296/43; 296/50; 296/181; 296/183
(58) Field of Search .................. 296/36, 43, 50, 296/181, 183

(56) References Cited

U.S. PATENT DOCUMENTS

| | | | | |
|---|---|---|---|---|
| 2,751,248 A | * | 6/1956 | Kritser | 296/43 |
| 3,574,391 A | * | 4/1971 | Doboze | 296/36 |
| 3,785,695 A | * | 1/1974 | Conkle | 296/50 |
| 4,216,988 A | * | 8/1980 | Weiss | 296/43 |
| 4,856,843 A | * | 8/1989 | Elliott | 296/181 |
| 5,071,185 A | * | 12/1991 | Schiele | 296/43 |
| 5,170,746 A | * | 12/1992 | Roose | 296/50 |
| 5,480,180 A | * | 1/1996 | Fuller et al. | 296/36 |
| 5,509,709 A | * | 4/1996 | Carroll | 296/36 |
| 5,669,617 A | * | 9/1997 | Pasin et al. | 296/43 |
| 6,152,510 A | * | 11/2000 | Newsome | 296/43 |
| 6,325,438 B1 | * | 12/2001 | Anderson | 296/43 |

FOREIGN PATENT DOCUMENTS

| | | | | |
|---|---|---|---|---|
| DE | 2008301 A | * | 2/1970 | 296/36 |
| FR | 1491521 A | * | 6/1966 | 296/43 |
| GB | 1363944 A | * | 8/1974 | 296/50 |

* cited by examiner

Primary Examiner—D. Glenn Dayoan
Assistant Examiner—Lori L Coletta
(74) Attorney, Agent, or Firm—J. E. Brunton, Esquire

(57) ABSTRACT

A side gate assembly for use with flatbed article transport vehicles of the character having longitudinally spaced apart stake receiving pockets disposed along the sides of the bed. The side gate assembly comprises a plurality of hingedly interconnected gates that can be easily moved from a securely locked position on the truck bed into a folded positioned so as to permit the vehicle to be loaded from the side, as for example, using a conventional forklift truck. The side gate assembly also includes a novel, easy-to-use locking means for releasably locking the assembly securely in position along the side of the transport vehicle.

15 Claims, 14 Drawing Sheets

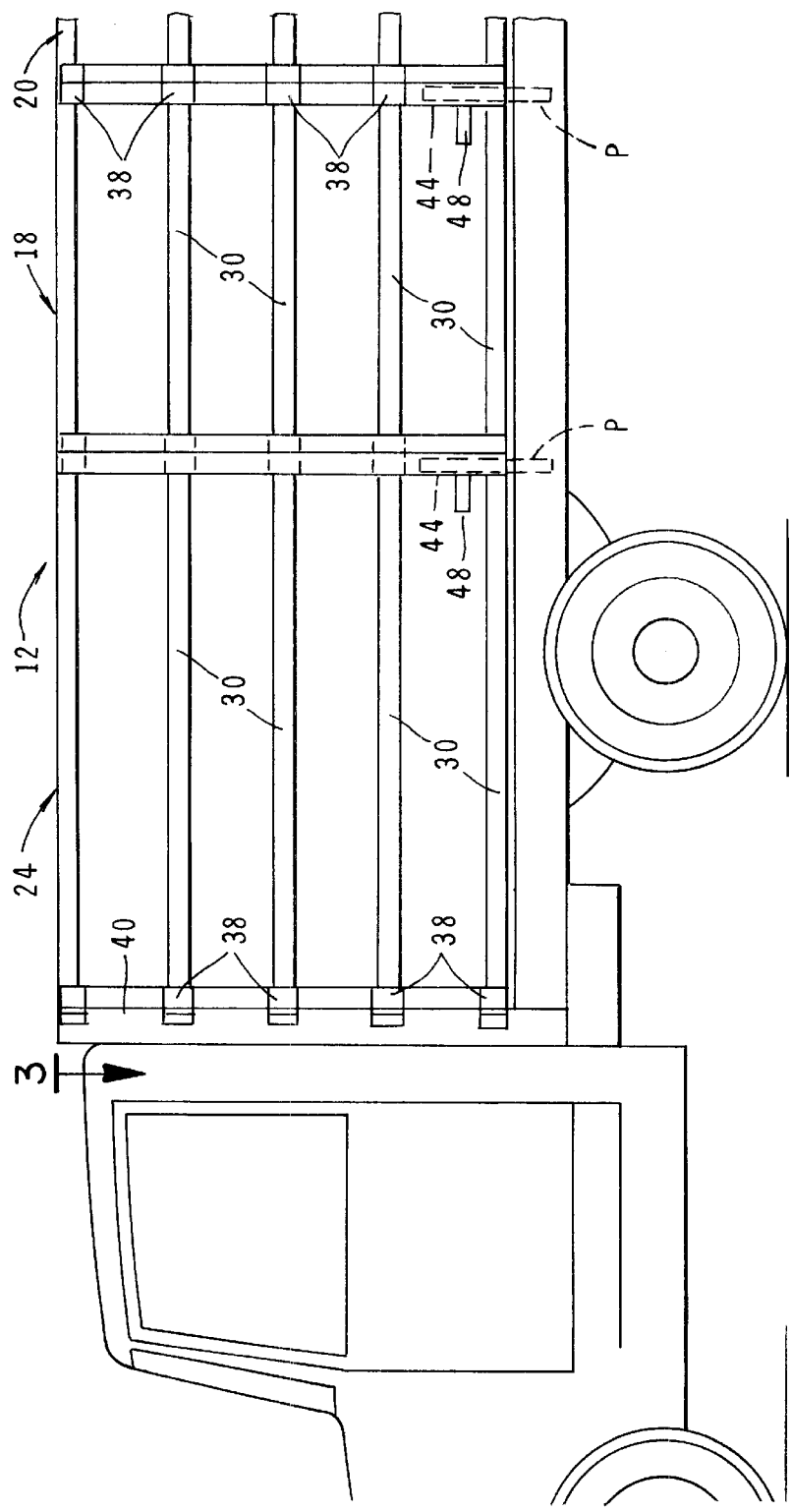
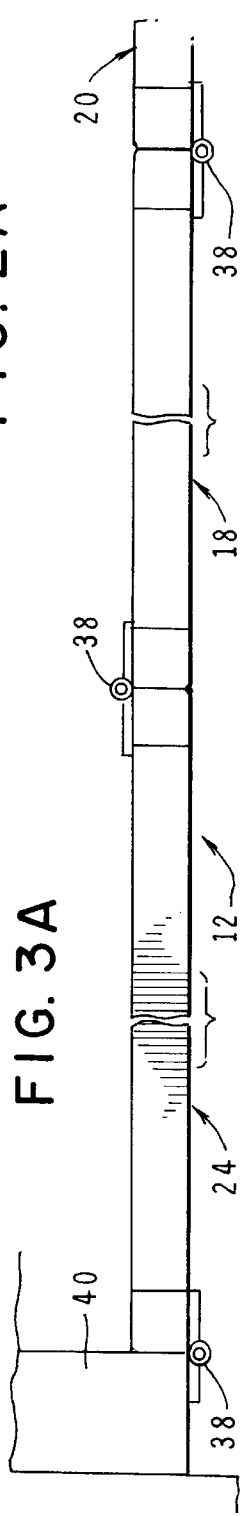
FIG. 2A
FIG. 3A

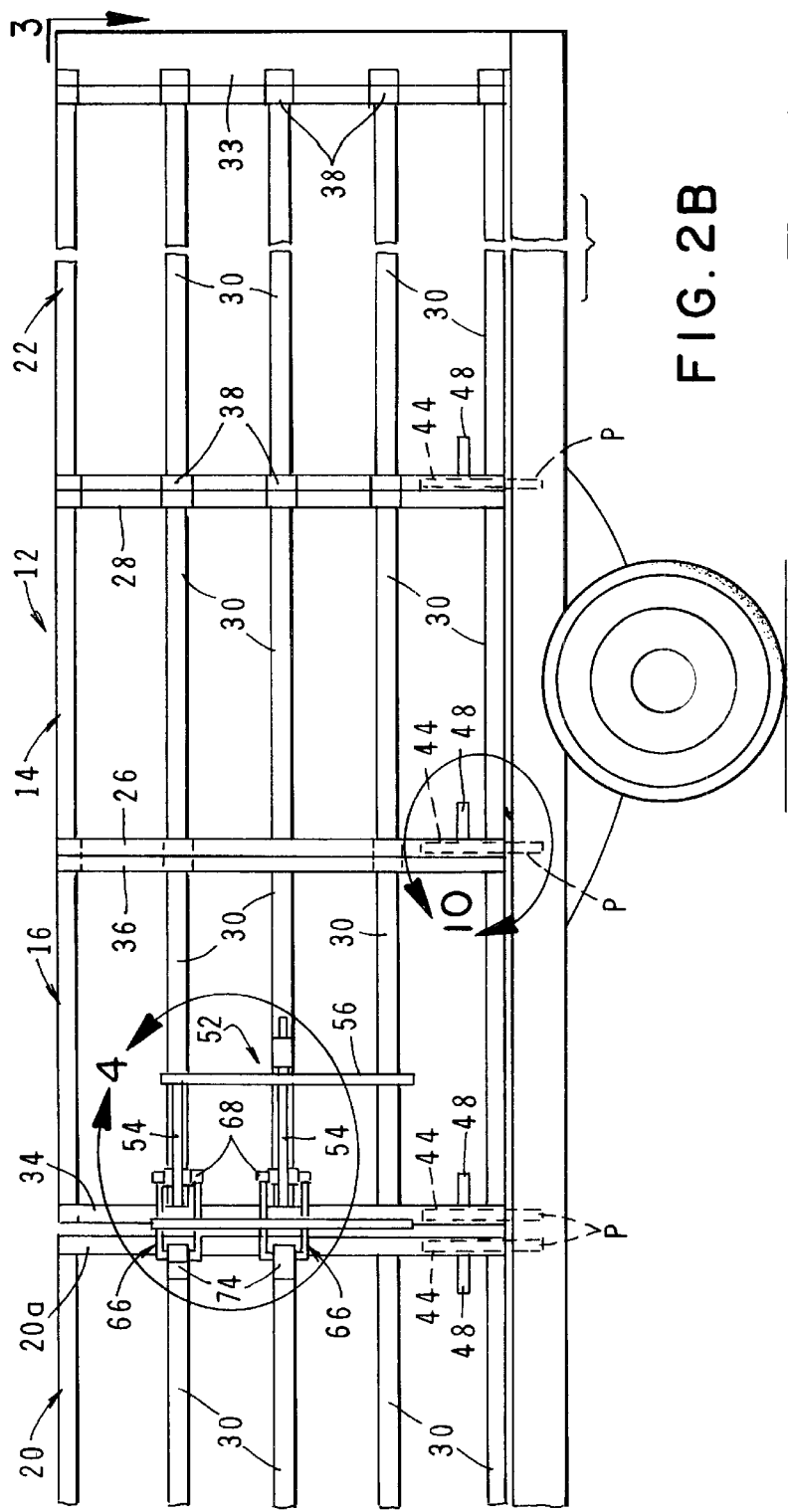
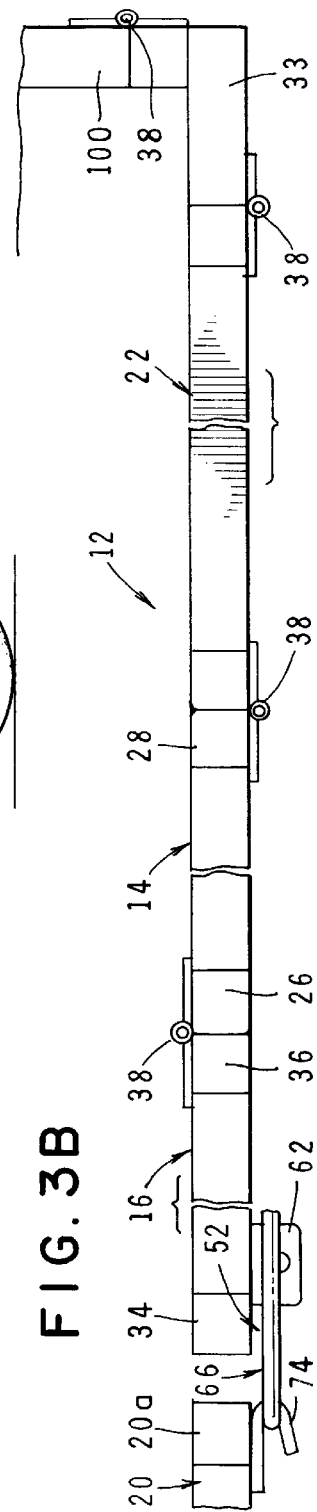

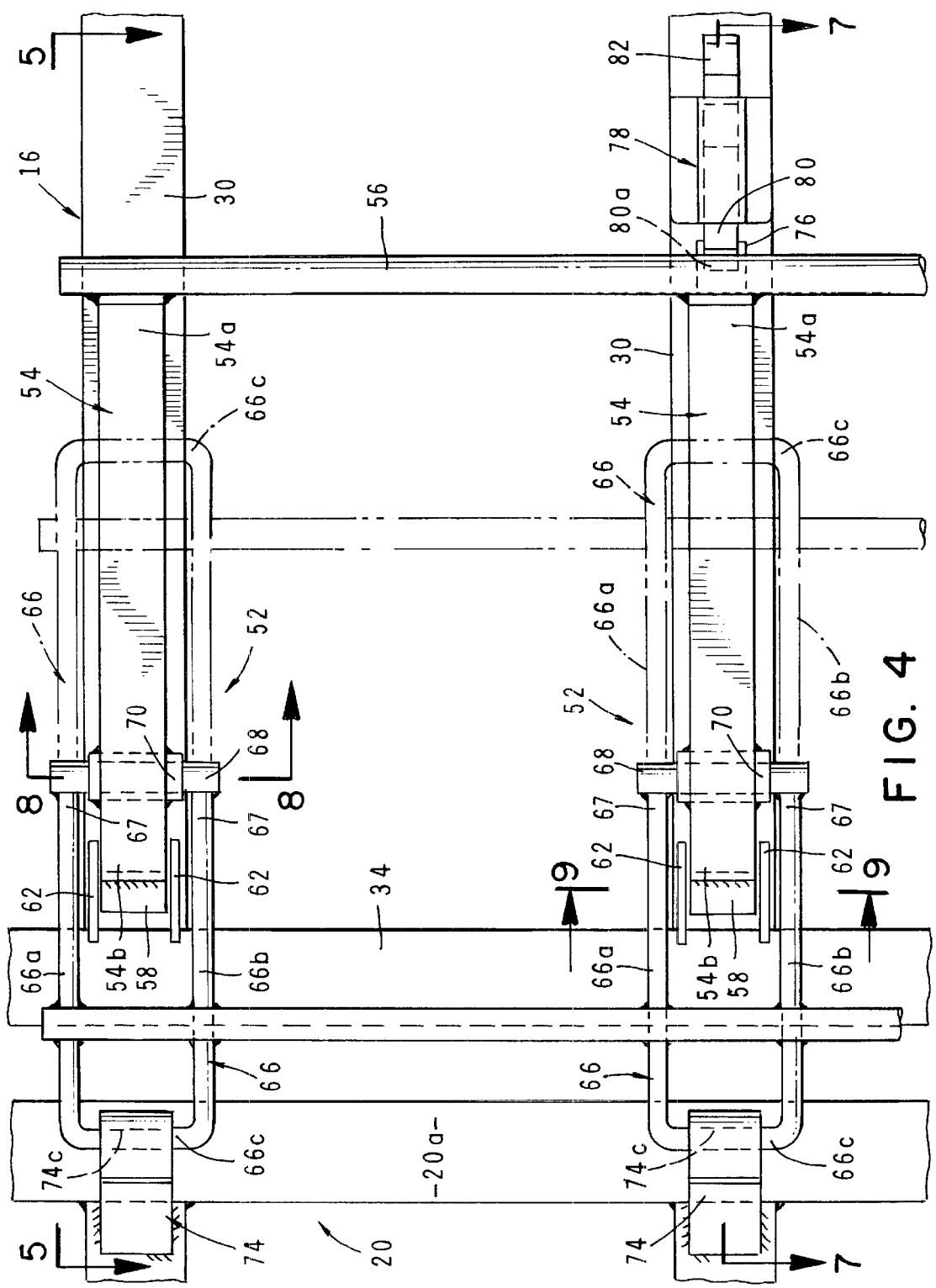

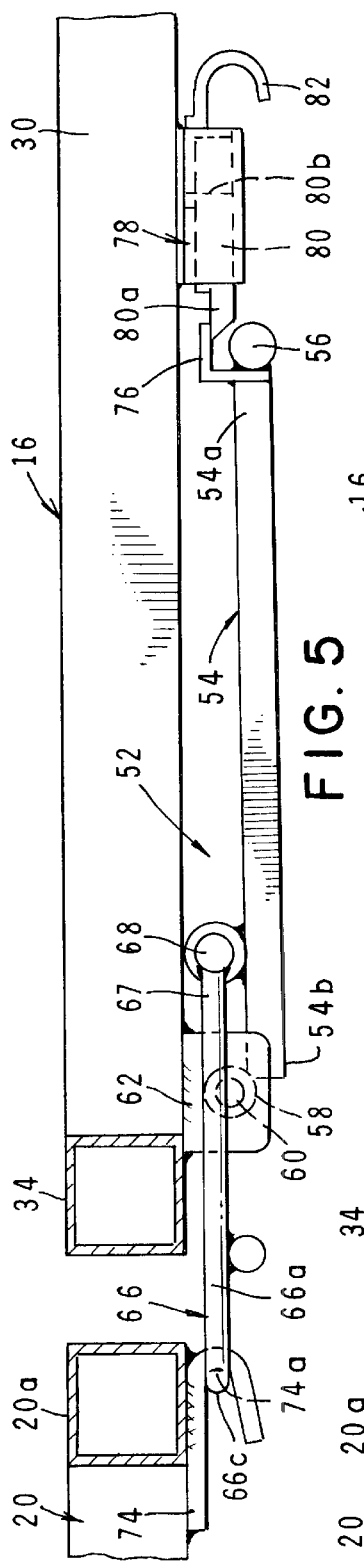
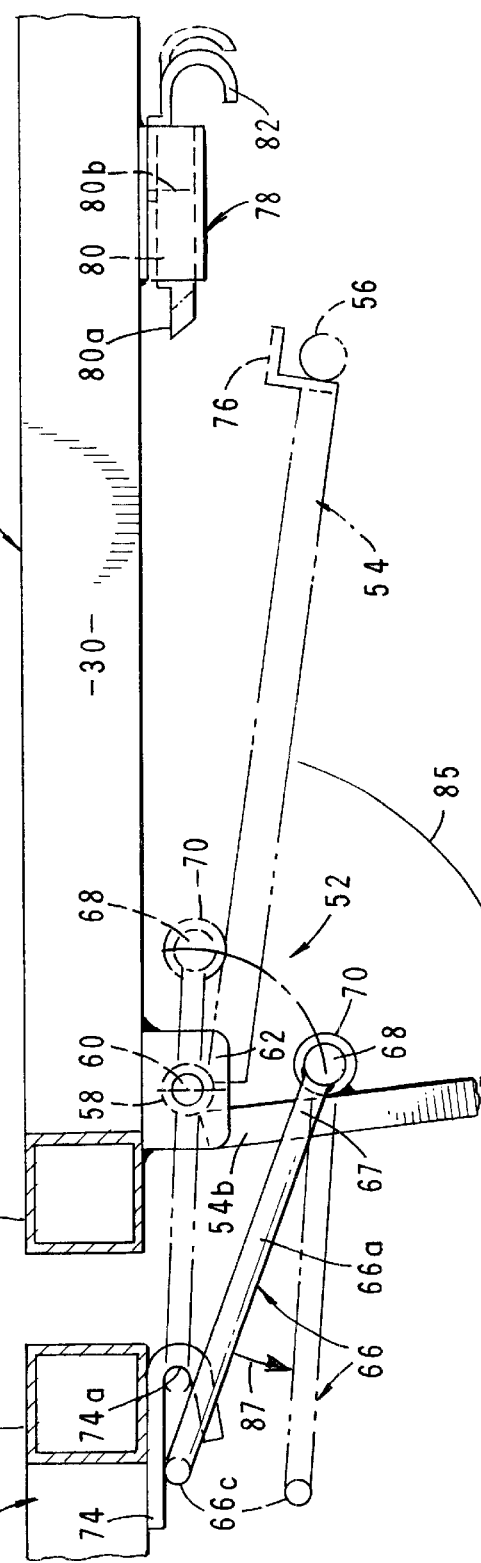

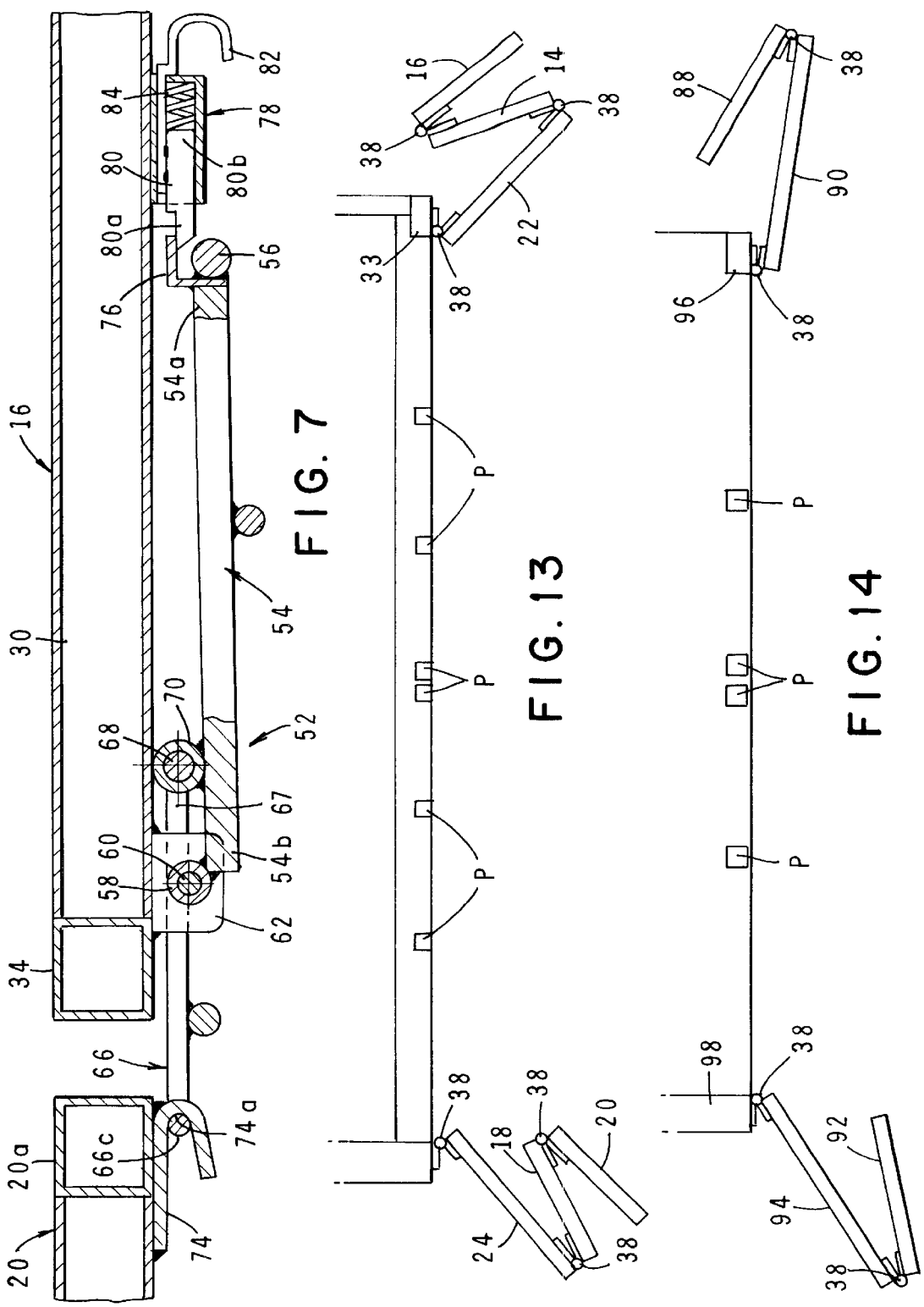

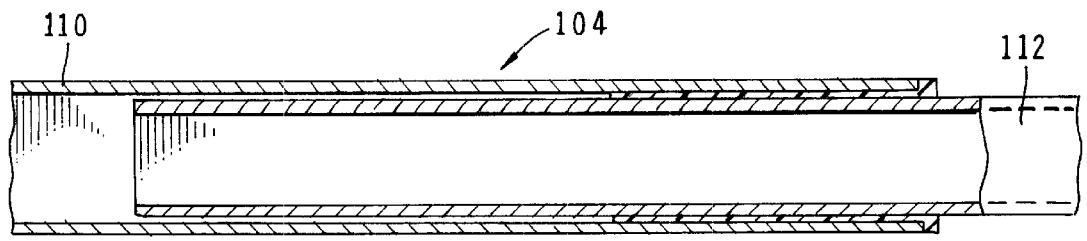
FIG.19
FIG.15B
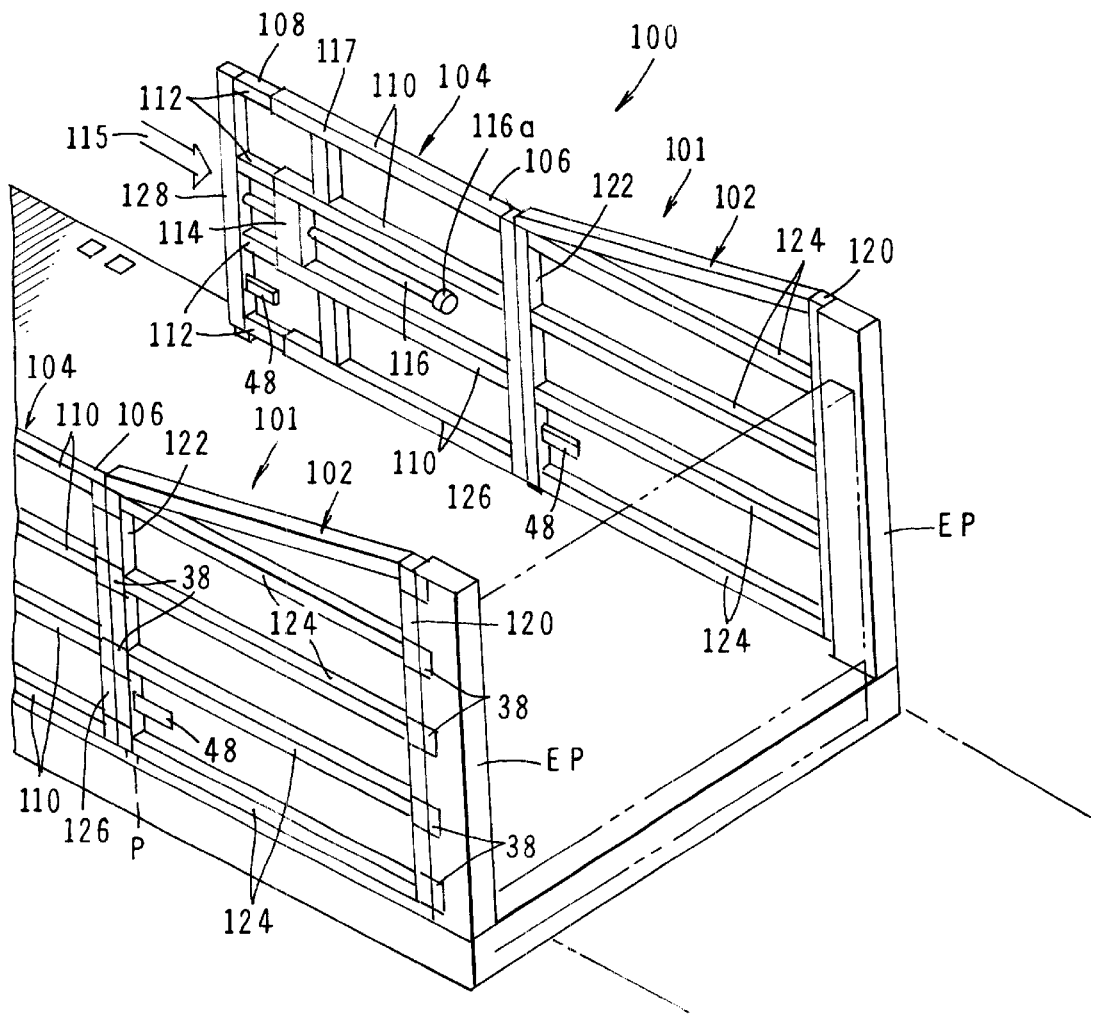

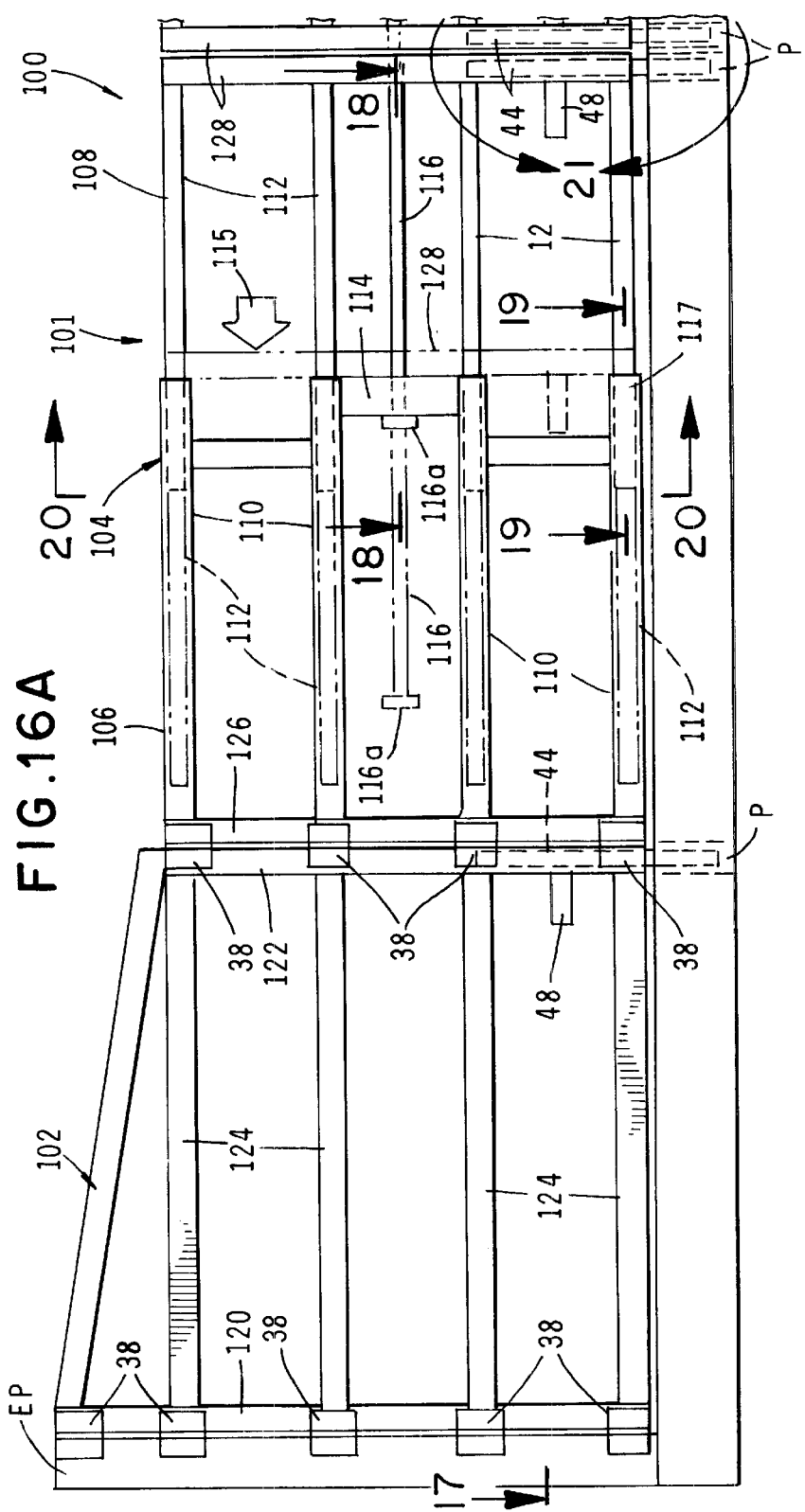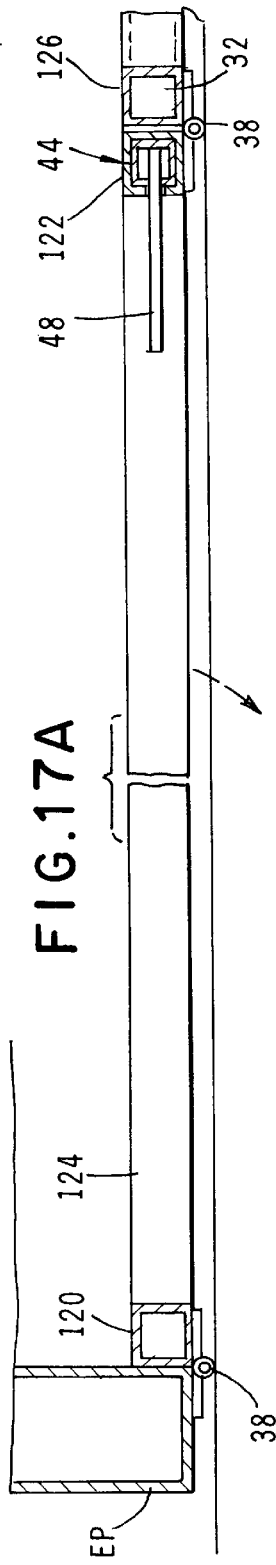
FIG. 16A
FIG. 17A

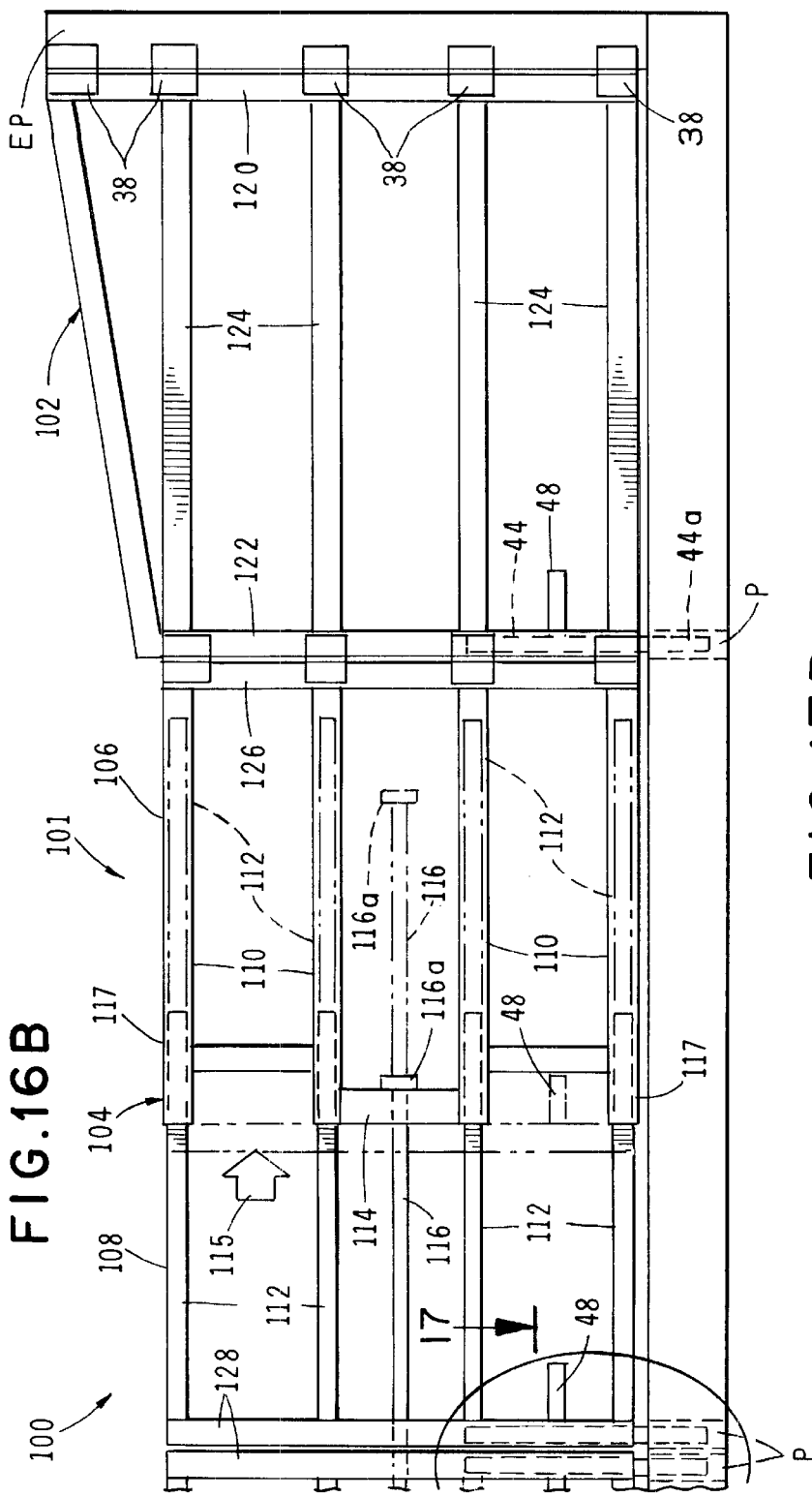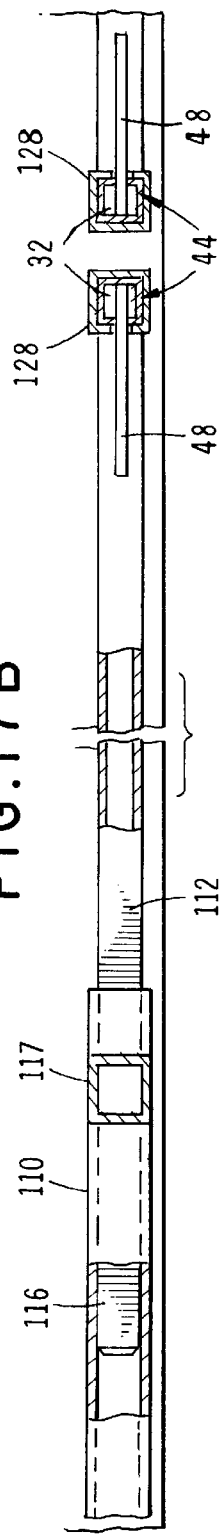

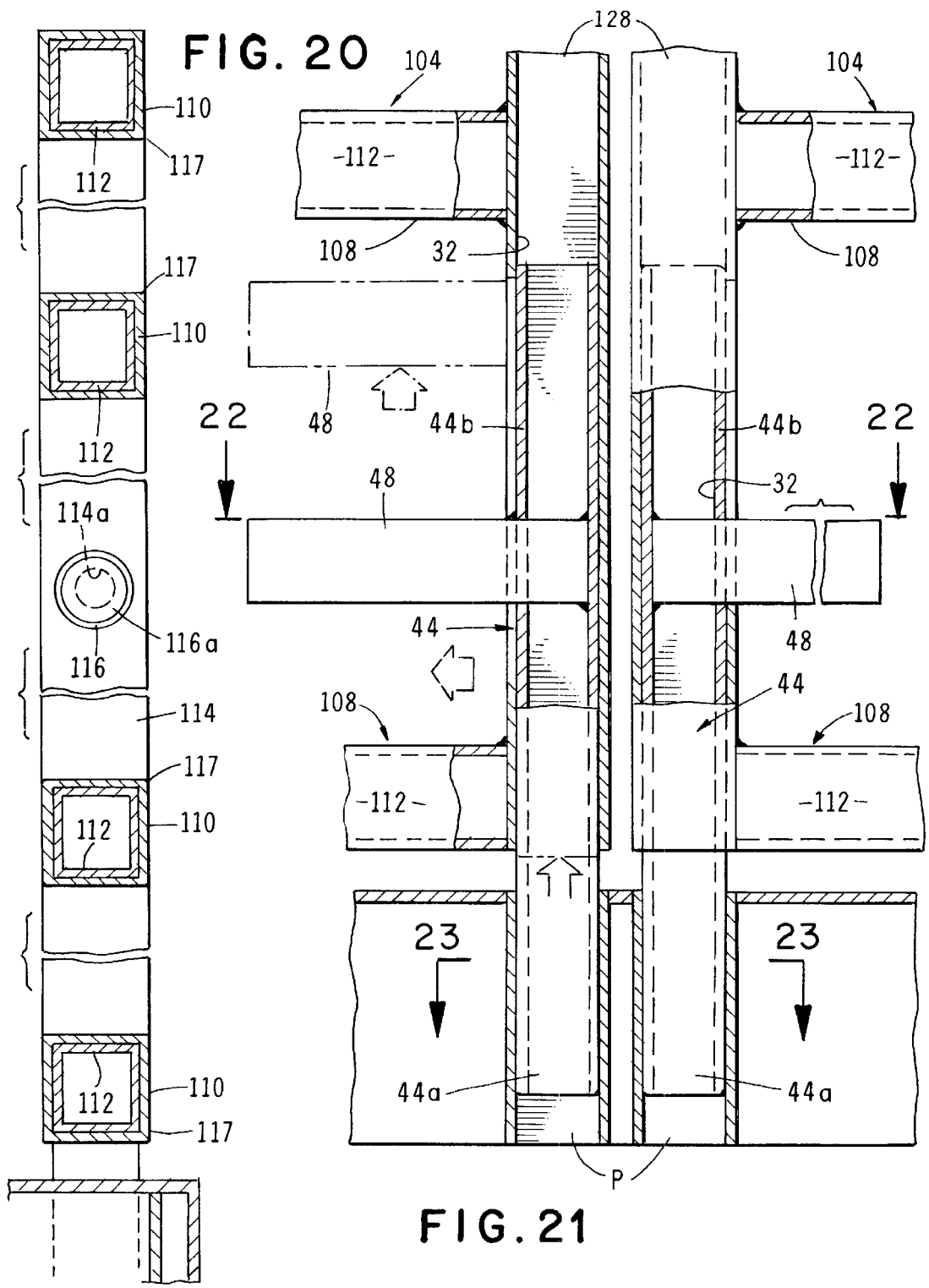

HINGEABLY CONNECTED SIDE GATES FOR USE WITH STAKEBED VEHICLES

This is a Continuation-In-Part application of application Ser. No. 09/655,173 filed Sep. 5, 2000, now U.S. Pat. No. 6,325,438.

BACKGROUND OF THE INVENTION

1. Field of the Invention

This invention relates generally to transport vehicles. More particularly, the invention concerns flat bed vehicular transport trucks of the character having removable side panels or gates that permit unrestricted side loading thereof.

2. Discussion of the Prior Art

Various types of truck trailers and truck beds for carrying a wide variety of loads are commonly in use. A quite common type of truck trailer is the so-called stake bed truck that provides a flat cargo area with no roof or permanently affixed sidewalls. These types of vehicles are typically used to carry heavy loads, generally of the character that can be loaded with a crane or fork lift truck.

To enable easy loading of the prior art flat bed trucks and trailers, the truck bed is often equipped with longitudinally spaced-apart, insertable side panels, or gates, that can be removed during loading and then reinstalled after loading to secure the load in place on the bed of the truck. Typically, the prior art gates are constructed from at least two vertically extending stakes that are telescopically receivable within longitudinally spaced-apart pockets provided along the sides of the truck bed. The vertical stakes are usually connected together by vertically spaced-apart wooden or metal slats that are typically about 4 to 6 feet long. As a general rule, the prior art gates vary in height between 12 and 96 inches and can weight up to 100 pounds or more.

The lifting, removing, and reinstalling of gates along the sides of the truck body is quite cumbersome and time-consuming and if incorrectly done, can cause serious injury. Accordingly, various other types of modified side gate constructions have been suggested in the past. By way of example, U.S. Pat. No. 4,640,544 discloses a semi-truck trailer having sidewalls formed by a plurality of hinged side-panels over which a tarpaulin can be tied. The side panels are hinged together so that each entire sidewall can be folded into the front portion of the trailer, thereby permitting use of the trailer as a flat bed. However, once the sidewalls are folded proximate with the forward end of the trailer and the load is positioned on the trailer bed, the walls cannot be repositioned along the sides of the truck bed.

U.S. Pat. No. 4,856,843 issued to Elliott describes a side loading trailer body having front, back, and sidewalls, a roof and a platform enclosing the interior of the trailer body. The side walls are formed by hingedly connected, side opening doors each of which, when opened, exposes the interior along the entire side of the body for loading purposes. The roof may be raised as required a predetermined distance above the walls. When the side doors have been opened and the roof raised, cargo loading and unloading can be accomplished using a conventional forklift type vehicle.

SUMMARY OF THE INVENTION

It is an object of the present invention to provide a new and novel side gate assembly for use with flatbed article transport vehicles of the character having longitudinally spaced apart stake receiving pockets disposed along the sides of the bed. The novel side gate assembly of the invention comprises a plurality of hingedly interconnected gates that can be easily moved from a securely locked position on the truck bed into a folded position so as to permit the vehicle to be loaded from the side, as for example, using a conventional forklift truck.

Another object of the invention is to provide a side gate assembly of the aforementioned character that can be used with conventional flatbed article transport vehicles without the requirement of substantial modification to the vehicles.

Another object of the invention is to provide a side gate assembly as described in the preceding paragraphs, that is easy to use, requires no lifting of the side gate sections so that the side gate assemblies can be easily operated by one workman with minimum training.

Another object of the invention is to provide a side gate assembly for use with flatbed article transport vehicles of various lengths, which includes side gate assemblies that comprise either double or triple hingedly interconnected gate subassemblies.

Another object of the invention is to provide a side gate assembly of the character described which includes a novel, easy-to-use locking means for releasably locking the assembly securely in position along the sides of the transport vehicle.

Another object of the invention is to provide a side gate assembly as described in the preceding paragraphs in which at least one of the side gate assemblies includes first and second slidably interconnected sections.

Another object of the invention is to provide a side gate assembly usable with flatbed article transport vehicles that is of a simple construction, and one which can be manufactured and assembled relatively inexpensively.

BRIEF DESCRIPTION OF THE DRAWINGS

FIGS. 2A and 2B, when considered together, comprise a side elevational view of the hingedly connected side gates as they appear when mounted on a vehicle such as a stake bed truck.

FIGS. 3A and 3B, when considered together, comprise a view taken along lines 3—3 of FIGS. 2A and 2B.

FIG. 4 is a greatly enlarged view of the area designated as 4 in FIG. 2B.

FIG. 5 is a view taken along lines 5—5 of FIG. 4.

FIG. 6 is a view similar to FIG. 5 but showing the gate latching mechanism in a released position.

FIG. 7 is a cross-sectional view taken along lines 7—7 of FIG. 4.

FIG. 13 is a fragmentary, top view of one side of the apparatus of FIG. 1 showing the hinged gates moved into an open position.

FIG. 14 is a top view of an alternate form of the apparatus of the invention having four sets of two hingedly interconnected gates rather than four sets of three hingedly interconnected gates.

FIGS. 15A and 15B when considered together comprise a generally perspective view of an alternate form of gate construction of the invention.

FIGS. 16A and 16B when considered together comprise a side elevational view of two sets of hingedly interconnected gates of the alternate construction shown in FIGS. 15A and 15B.

FIGS. 17A and 17B when considered together comprise a cross-sectional view taken along lines 17—17 of FIGS. 16A and 16B.

FIG. 19 is a cross-sectional view taken along lines 19—19 of FIG. 16A.

FIG. 20 is a cross-sectional view taken along lines 20—20 of FIG. 16A.

FIG. 21 is a greatly enlarged view of the area designated in FIG. 16A by the numeral 21.

DESCRIPTION OF THE INVENTION

Figure 1:
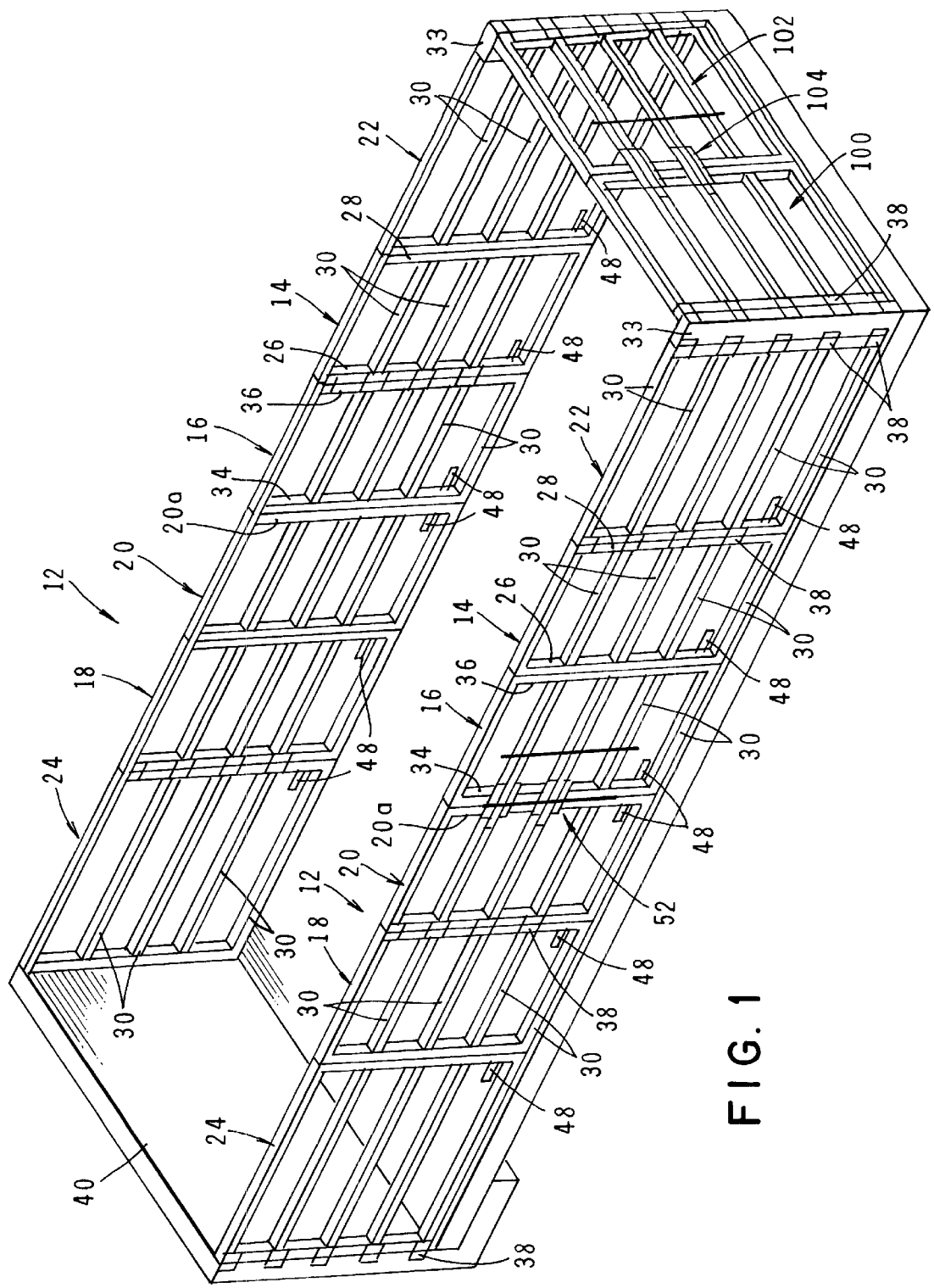
FIG. 1 is a generally perspective view of one form of the hingedly connected side gates usable with stake bed vehicles.
Figure 8:
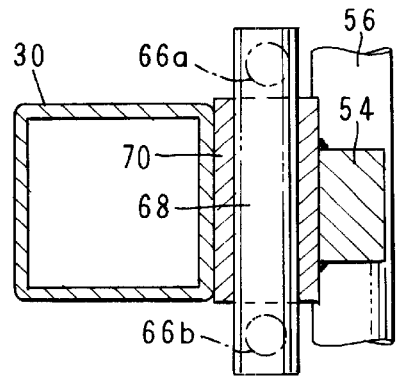
FIG. 8 is a cross-sectional view taken along lines 8—8 of FIG. 4.
Figure 9:
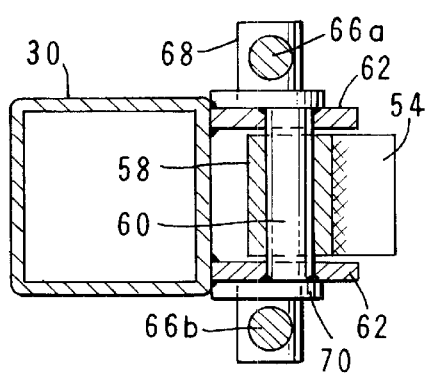
FIG. 9 is a cross-sectional view taken along lines 9—9 of FIG. 4.

Referring to the drawings and particularly to FIGS. 1, 2A, 2B, and 10, one form of the side gate assembly of the present invention is there illustrated. The side gate assembly is specifically designed for use with flatbed trucks of the character shown in FIGS. 2A and 2B that have a plurality of longitudinally spaced-apart, stake-receiving pockets "P" located along the sides and the rear of the bed of the truck. In the form of the invention shown in FIG. 1, the side gate assembly comprises two side gate assemblies, one for each side of the truck bed. These two side gate assemblies are of substantially identical construction and are designed for use with stake bed trucks of conventional construction. A rear gate assembly, the character of which will later be described can be used at the rear of the truck bed.

Figure 11:
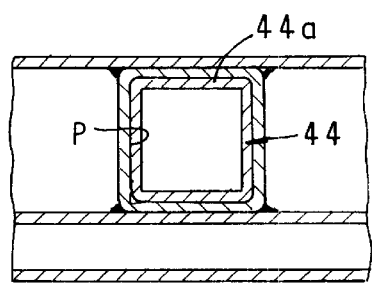
FIG. 11 is a cross-sectional view taken along lines 11—11 of FIG. 10
Figure 12:
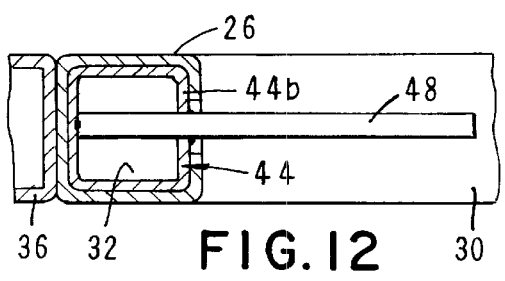
FIG. 12 is a cross-sectional view taken along lines 12—12 of FIG. 10.
Figure 10:
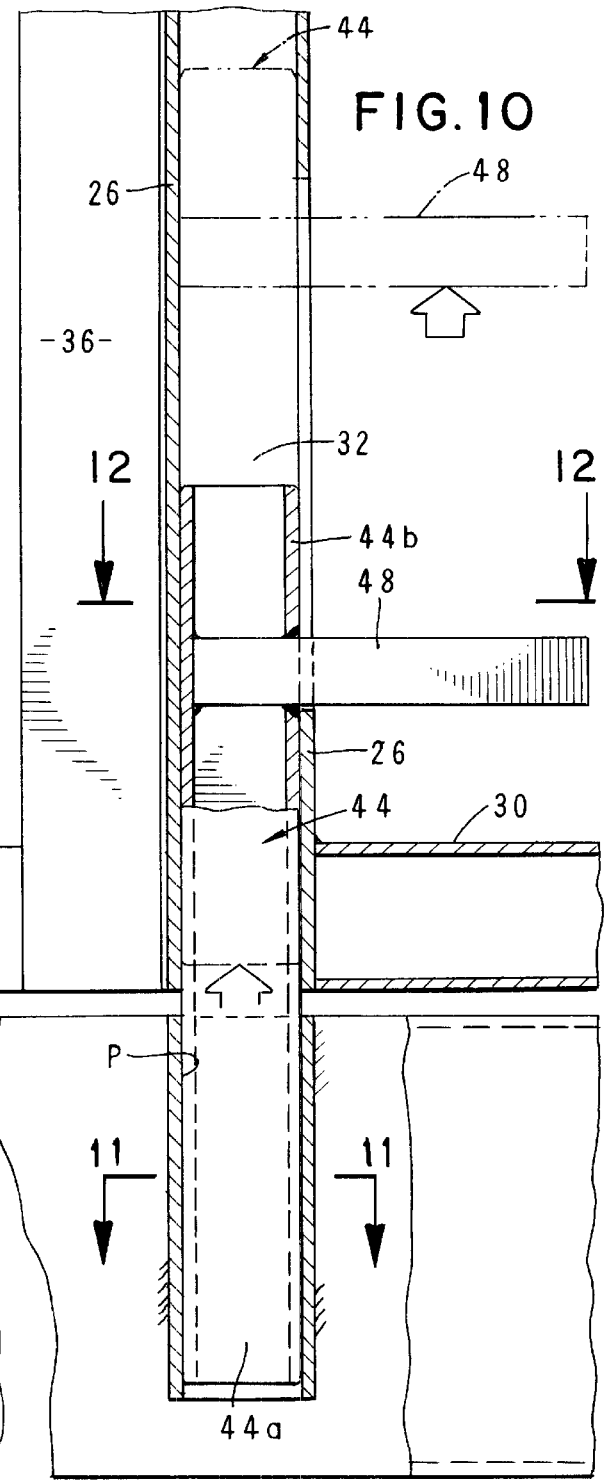
FIG. 10 is a greatly enlarged view of the area designated as 10 in FIG. 2B.

As best seen in FIG. 1, each side gate assembly 12 of the invention comprises first, second, third, fourth, fifth and sixth hingedly interconnected gates identified in FIG. 1 by the numerals 14, 16, 18, 20, 22, and 24 respectively. Each of the side gates includes longitudinally spaced-apart end posts that are interconnected by a plurality of vertically spaced-apart tubular members 30. For example, first side gate 14 includes spaced apart end posts 26 and 28 that are interconnected by longitudinally extending, vertically spaced-apart members 30. As indicated in FIGS. 10, 11, and 12, each of the end posts of each of the side gates is also of a tubular construction, having a hollow interior space 32.

Hingedly interconnected to first side gate 14 is the previously identified second side gate 16 which includes longitudinally spaced apart end posts 34 and 36 that are also interconnected by generally horizontally extending, vertically spaced-apart members 30. As illustrated in FIG. 13, fifth side gate 22 is hingedly connected to a vertically extending truck bed post 33 located at the rear of the truck bed and is adapted for swinging movement between a first position shown in FIG. 1 to a second position shown in FIG. 13. Similarly, side gate 14 is hingedly interconnected to fifth side gate 22 for swinging movement between a first location shown in FIG. 1 and a second location shown in FIG. 13. The gates are interconnected to each other and to the truck bed end posts 33 by a conventional double leaf type hinge 38 that is of the conventional construction best seen in FIGS. 3A, 3B and 13. As indicated in FIG. 13, gates 22 and 24 are hingedly connected to the forward and rearward corners of the truck bed. More particularly, side gate 24 is hingedly connected to a front panel of the truck bed 40, while, as previously mentioned, fifth side gate 22 is hingedly connected to truck bed end post 33. Forming an important aspect of the present invention is locking means that are carried by one of the end posts of each of the side gates for locking the side gate in position relative to the truck bed. As best seen by referring to FIGS. 10 and 12, this important locking means is of the same construction for each side gate and comprises a stake-like locking member 44 having a first end 44a that is telescopically receivable within a selected stake bed receiving pocket "P" and a second opposite end 44b that is telescopically movable within interior space 32 of an end post of the side gate such as end post 26. Members 44 are appropriately sized so as to be closely received within the pockets found in conventional stake bed trucks. Further, the locking members are strategically spaced apart so that the side gates can be used with conventional stake bed trucks without having to modify the location and spacing of the pockets. Also forming a part of the locking means of the invention is lifting means for moving the locking member 44 from the downward position shown in FIG. 10 to an upraised position wherein the lower portion 44a of locking member 44 clears pocket "P" and resides solely within interior space 32 of post 26. This lifting means here comprises a lifting handle 48 that is connected to locking member 44 as by welding in the manner indicated in FIGS. 10 and 12. As shown in the drawings, lifting handle 48 extends outwardly from locking member 44 so that it can be easily gripped by a workman to raise the locking member from the lowered locking position shown in FIG. 10 to an upraised position, which will permit swinging movement of the gate relative to the bed of the truck. As indicated in FIGS. 1, 2A and 2B, each of the side gates of each of the side gate assemblies is provided with locking means of the character described in the preceding paragraph so that each of the side gates 14, 16, 18, 20, 22 and 24 can be hingedly folded in the manner indicated in FIG. 13. Each of these locking means is of identical construction and operation to that illustrated and described in connection with locking gate 16.

Turning next to FIGS. 4 through 7, the connector means of the invention for interconnecting second gate 16 with fourth gate 20 is there illustrated. The connector means, which forms and important aspect of the invention, here comprises a pair of vertically spaced latching mechanisms 52 that are of an identical construction. Each of the latching mechanisms comprises a longitudinally extending lifting member 54 having first and second ends 54a and 54b respectively. Ends 54a of the lifting members of the two latching mechanisms are interconnected by a generally vertically extending, generally cylindrically shaped lifting bar 56 (FIG. 4). As shown in FIG. 4, the opposite ends 54b of each of the lifting members are interconnected as by welding with a vertically extending tubular member 58. Tubular member 58 is configured to receive a shaft 60 that is connected to and spans a pair of upstanding plates 62 that are connected as by welding to end post 34 and to a selected one of the longitudinally extending members 30. With this construction, a lifting force exerted on handle 56 will cause members 54 to pivot about the axis of shaft 60 (see FIG. 6).

Connected to each of the members 54, for pivotal movement with respect thereto, is a generally U-shaped latching member 66. More particularly, as best seen in FIG. 4, each latching member 66 comprises first and second sides 66a and 66b respectively and a bight portion 66c that interconnects the two sides. The inboard ends 67 of side members 66a and 66b are connected, as by welding, to a shaft 68. In turn, shaft 68 is rotatably received within a tubular member 70 that is welded to member 54 intermediate its ends (FIGS. 4 and 5).

Latching members 66 are latchably interconnected with a hook-like clasp member 74 that is affixed to a vertically extending end post such as end post 20a of fourth gate 20. As best seen by referring to FIG. 5, when the latching mechanism is in its latched position shown in FIG. 5, bight portion 66c of latching member 66 is closely received within the channel portion 74a of clasp 74.

Affixed proximate end 54b of lifting member 54 is an angle bracket 76 that is engaged by the securement means of the invention for securing the latching mechanism in its first or latched position shown in FIGS. 4 and 5. This securement means here comprises a housing 78 that is affixed to a selected one of the members 30 of second gate 16. Slidably movable within housing 78 is locking finger 80 having an outboard extremity 80a that is adapted to lockably engage angle bracket 76 when the second and fourth gates are in the closed position shown in FIG. 1 (see also FIG. 5). Connected to the second end 80b of finger 80 is a finger pull element 82 that can be pulled rearwardly of housing 78 in the manner indicated by the phantom lines in FIG. 6 to move latching member 80 inwardly of the housing so that extremity 80a clears bracket 76. In the present form of the invention, biasing means are disposed internally of housing 80 to continuously urge extremity 80a of finger 80 into locking engagement with angle bracket 76. The biasing means is here provided in the form of a coil spring 84 that is housed within housing 78 (FIG. 7).

In operating the connector means of the invention, latching member 80 is moved from the first latching position shown in FIG. 5 to the second latching position shown in FIG. 6 by pulling on pull 82 to release locking member 80 from angle member 76. An outward force exerted on lifting handle 56 in the direction indicated by the arrow 85 of FIG. 6 will then cause members 54 to pivot into the outward position shown by the solid lines in FIG. 6. As the lifting members so pivot, latching member 66 will also pivot about the axis of shaft 68 permitting bight portion 66c to move outwardly of channel 74a of clasp 74 in the manner illustrated in FIG. 6. Once the latching member has cleared clasp 74, it can be moved in the direction of the arrow 87 of FIG. 6 into the position shown by the phantom lines in FIG. 6. In this position, it is apparent that second gate 16 is free to move relative to fourth gate 20 and can be swung outwardly relative to gate 20. Upon operation of the locking means associated with gates 14, 16, and 22, it is apparent that the assemblage made of these gates can be moved into the folded configuration shown in FIG. 13. Similarly, upon operation of the locking means associated with gates 18, 20, and 24, the assemblage made of these gates can also be folded into the configuration shown in FIG. 13. With the gates in this folded configuration the truck bed is easily accessible for side loading. When the loading is complete, the gate assemblages can be return to their starting position and secured in place by the locking and connector means of the invention. It is to understood that when higher side gates are used, two or more connector mechanisms could be used.

Turning to FIG. 14, an alternate form of the apparatus of the invention is there illustrated. This form of the apparatus is similar in most respects to that previously described herein. However, in this embodiment, which is adapted to be used with trucks having a shorter bed, the side gate assemblies each comprise only four side gates designated in FIG. 14 as 88, 90, 92 and 94 respectively. Side gates 88 and 90 are interconnected by a hinge 38. The assemblage thus form is hingedly interconnected by a hinge 38 with truck bed end post 96. In a similar manner, side gates 92 and 94 are hingedly interconnected by a hinge 38 and the assemblage thus formed is hingedly connected by a hinge 38 to a front panel 98 of the truck bed. Each of the side gates is provided with locking means of the character previously described and gates 88 and 92 can be interconnected by the a connector means of the character previously described. The operation of the locking means and the connector means of this latest embodiment of the invention is identical to that previously described and will note be further discussed herein.

Turning once again to FIG. 1, it is to be noted that in the embodiment of the invention there shown, the end of the truck bed can also be closed by a pair of gates 100 and 102 that are hingedly interconnected with truck bed end posts 33 by conventional hinges such as hinges 38. Connector means are provided to lock gates 100 and 102 in the closed position shown in FIG. 1. The connector means, which is generally designated in FIG. 1 by the numeral 104 is identical in construction and operation to the connector means described in connection with side gate assemblies 12.

Referring next to FIGS. 15A through 25 of the drawings, an alternate form of the side gate assembly of the present invention is there illustrated and generally designated by the numeral 100. As before, this side gate assembly is specifically designed for use with flatbed trucks of the character shown in FIGS. 2A and 2B that have a plurality of longitudinally spaced-apart, stake-receiving pockets "P" located along the sides and the rear of the bed of the truck. In the alternate form of the invention shown in FIGS. 15A and 15B, the side gate assembly comprises two side gate assemblies, one for each side of the truck bed. These two side gate assemblies are of substantially identical construction and are designed for use with stake bed trucks of conventional construction. A rear gate assembly, of the general character earlier described can be used at the rear of the truck bed.

Figure 15A:
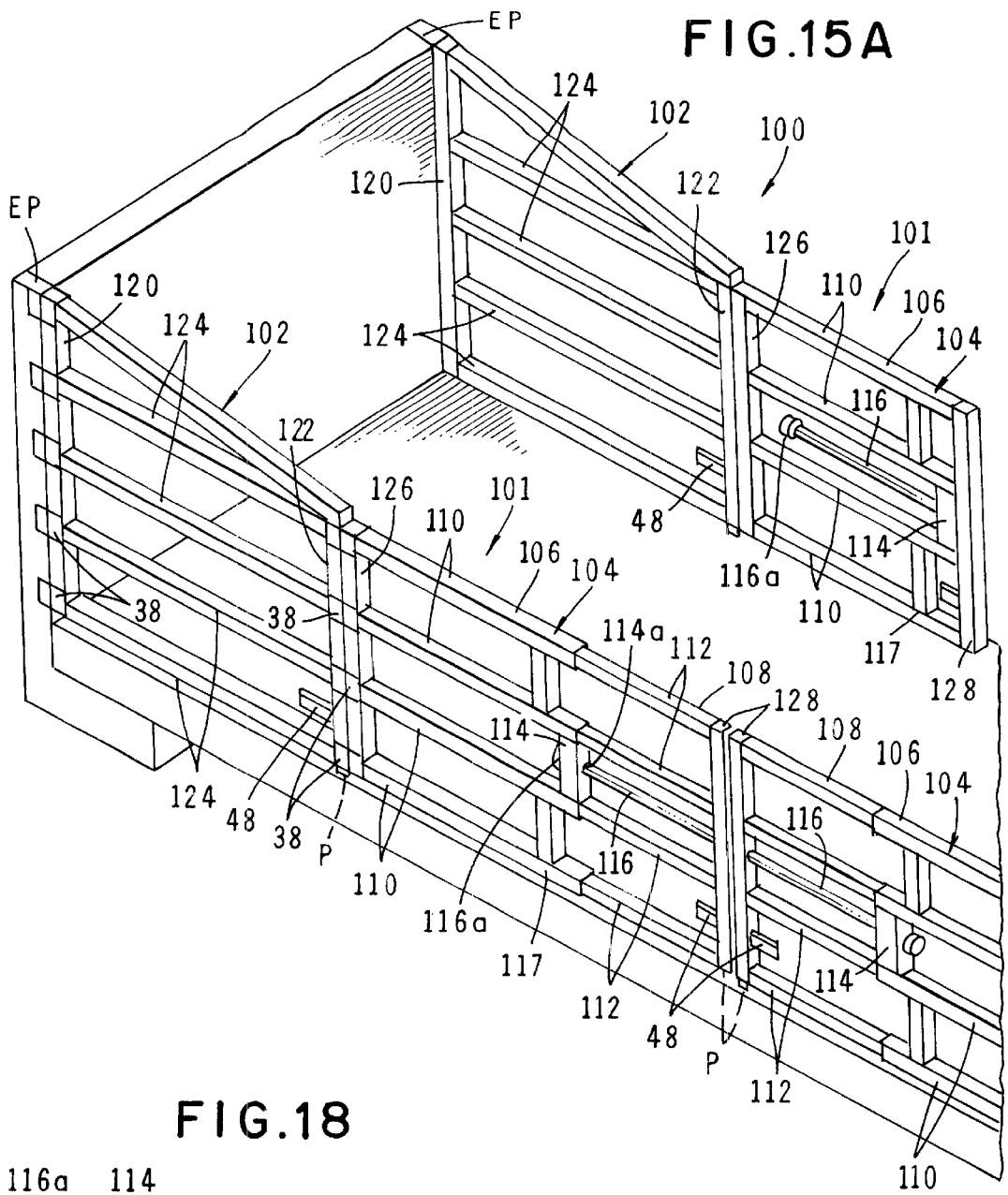

As best seen in FIGS. 15A and 15B, each side gate assembly 101 of the invention comprises a first, or end gate 102 and a second, or middle gate 104. These first and second gates are hingedly connected together and the first gate 102 of each gate assembly is hingedly connected to an end post "EP" provided on the bed of the truck. Uniquely, second or middle gate 104 comprises first and second slidably interconnected sections 106 and 108 respectively. More particularly, first section 106 comprises a plurality of longitudinally extending first tubular members 110 and second section 108 comprises a plurality of longitudinally extending, generally tubular shaped second members 112 that are telescopically receivable within first tubular members 110 (see FIG. 19).

Figure 18:
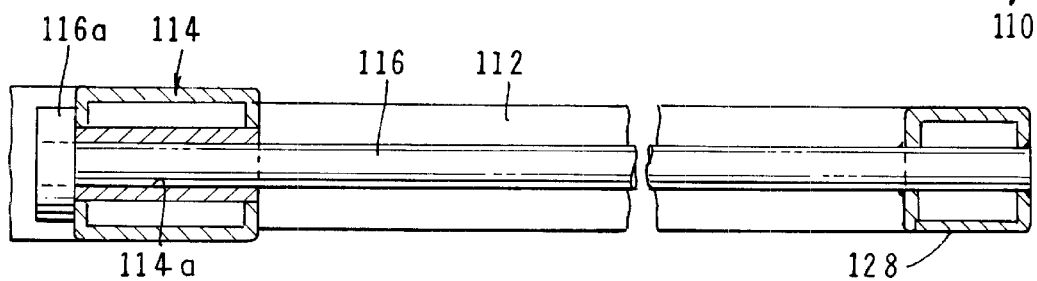
FIG. 18 is a cross-sectional view taken along lines 18—18 of FIG. 16A.

Also forming a part of each gate assembly 101 is stop means for stopping the travel of the second gate 104 as it is moved into its extended position shown by the solid lines in FIG. 15A. This stop means here comprises a vertically extending stop member 114 which forms a part of the superstructure 117, which, in turn, forms a part of first section 106. The stop means also includes a longitudinally extending generally cylindrically shaped member 116 which forms a part of second section 108. Stop member 114 is provided with an aperture, or opening 114a that telescopically receives cylindrically shaped member 116 (FIG. 18). With this construction, as second section 108 is moved toward first section 106 in the direction of the arrows 115 in FIGS. 16A and 16B, member 116 will move from the position shown in the solid lines in FIGS. 16A and 16B to the position shown by the phantom lines in these figure drawings. When second section 108 is moved in the opposite direction, or to the right as viewed in FIG. 16A, cylindrically shaped member 116 will move to the right until the end portion 116a provided thereon moves into engagement with stop member 114 in the manner shown by the solid lines in FIG. 16A.

Figure 22:
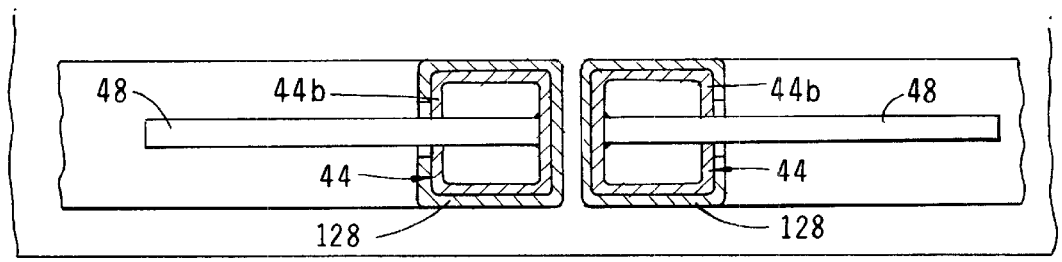
FIG. 22 is a cross-sectional view taken along lines 22—22 of FIG. 21.
Figure 23:
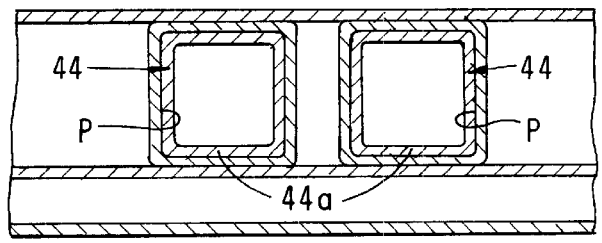
FIG. 23 is a cross-sectional view taken along lines 23—23 of FIG. 21.

Each of the side gates 102 and 104 includes longitudinally spaced-apart, vertically extending end posts. More particularly, side gate 102 includes end posts 120 and 122 that are interconnected by a plurality of vertically spaced-apart tubular members 124. Similarly, side gate 104 includes longitudinally spaced end posts 126 and 128 that are interconnected by the previously identified tubular members 110 and 112. As indicated in FIGS. 17A and 17B, each of the end posts of each of the side gates is also of a tubular construction, having a hollow interior space 32. The gates are interconnected to each other and to the truck bed end posts "EP" by conventional double leaf type hinges 38 that are of the conventional construction best seen in FIGS. 3A, 3B and 13. Forming an important aspect of the present invention is locking means that are carried by one of the end posts of each of the side gates for locking the side gate in position relative to the truck bed. This important locking means is of the same general construction as described in connection with the earlier discussed embodiment of the invention and like numbers are used in FIGS. 15A through 25 to describe like components. As best seen in FIGS. 21, 22 and 23, the locking means of the side gates comprises a stake-like locking member 44 having a first end 44a that is telescopically receivable within a selected stake bed receiving pocket "P" and a second opposite end 44b that is telescopically movable within interior space 32 of an end post of the side gate such as end posts 128. As before, members 44 are appropriately sized so as to be closely received within the pockets found in conventional stake bed trucks. Further, the locking members are strategically spaced apart so that the side gates can be used with conventional stake bed trucks without having to modify the location and spacing of the pockets.

Also forming a part of the locking means of this latest form of the invention is lifting means for moving the locking member 44 from the downward position shown in FIG. 21 to an upraised position wherein the lower portion 44a of locking member 44 clears pocket "P" and resides solely within interior space 32 of the end post. Once again, this lifting means comprises a lifting handle 48 that is connected to locking member 44 as by welding in the manner indicated in FIG. 21. As shown in the drawings, lifting handle 48 extends outwardly from locking member 44 so that it can be easily gripped by a workman to raise the locking member from the lowered locking position to an upraised position, so as to permit swinging movement of the gate relative to the bed of the truck in the manner shown in FIG. 25.

Figure 25:
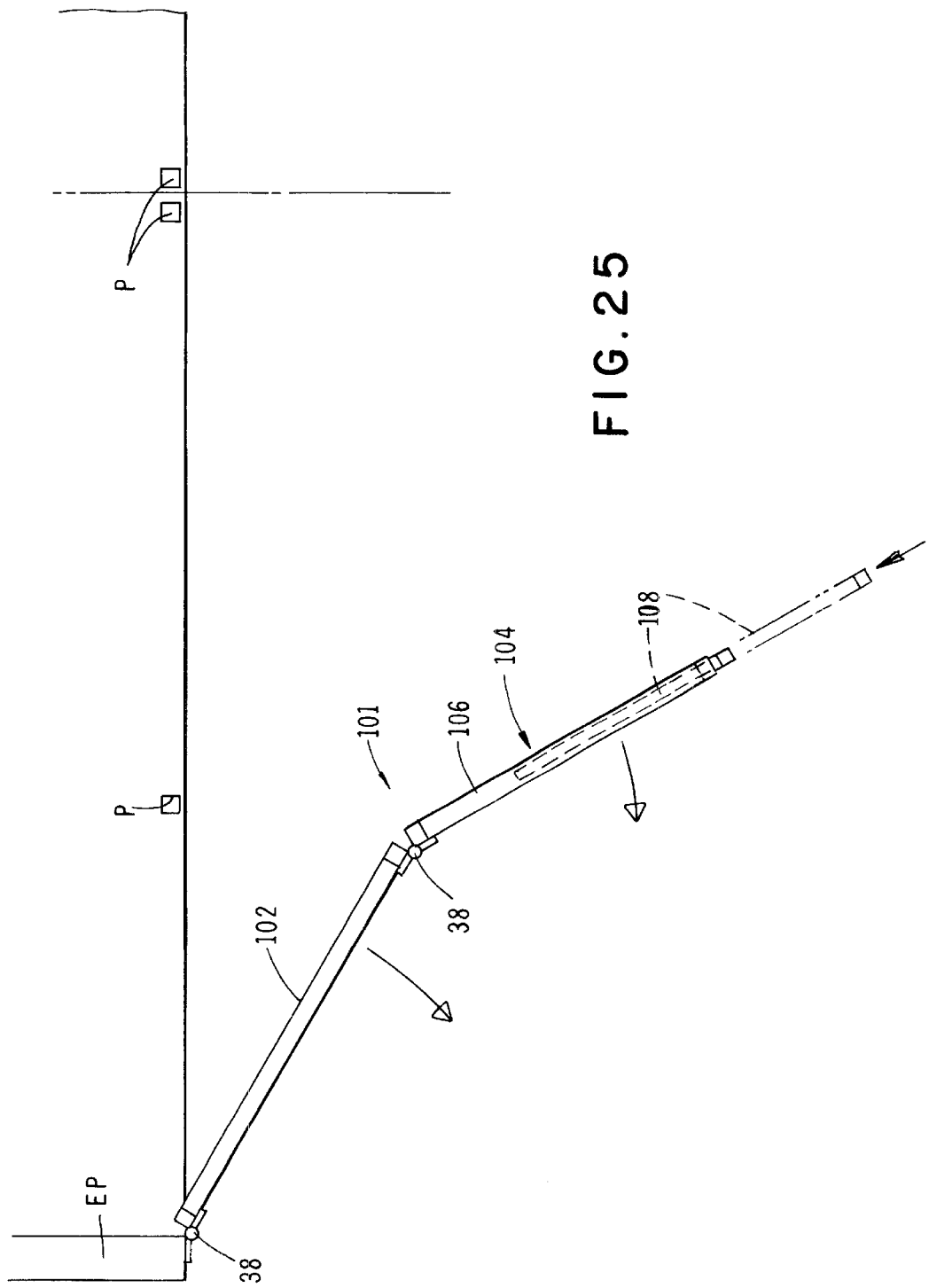
FIG. 25 is a top plan, generally diagrammatic view illustrating the manner of folding of the side gates on one side of the truck bed.

It is to be understood that each of the side gate assemblies is provided with locking means of the character described in the preceding paragraph so that each of the side gates 102 and 104 can be hingedly folded in the manner indicated by the arrows in FIG. 25. Each of these locking means is of identical construction and operation to that illustrated and described in connection with the earlier described embodiments of the invention.

In operating the apparatus of this latest form of the invention, the locking member 44 of one of the second gates 104 on one side of the truck is moved from the first downward or locking position shown in FIG. 21 to the second or upward position shown by the phantom lines in FIG. 21 by lifting member 48. This done, second section 108 is urged to the left his viewed in FIG. 16A so as to cause generally cylindrically shaped members 112 to telescope into tubular members of the first section as indicated by the phantom lines in FIG. 16A. If desired, gate 104 can be pivoted outwardly relative to gate 102 so as to provide access to at least portion of the truck bed. Alternatively, locking member 44 of first gate 102 can be lifted to a position wherein end 44a clears pocket "P" thereby enabling the assemblage made up of gates 102 and 104 to pivot outwardly relative to the end post EP to which gate 102 is connected (see FIG. 25).

With the gates in the folded configuration the truck bed is easily accessible for side loading. When the loading is complete, the gate assemblages can be returned to their starting position and secured in place by the locking means of the invention.

Figure 24:
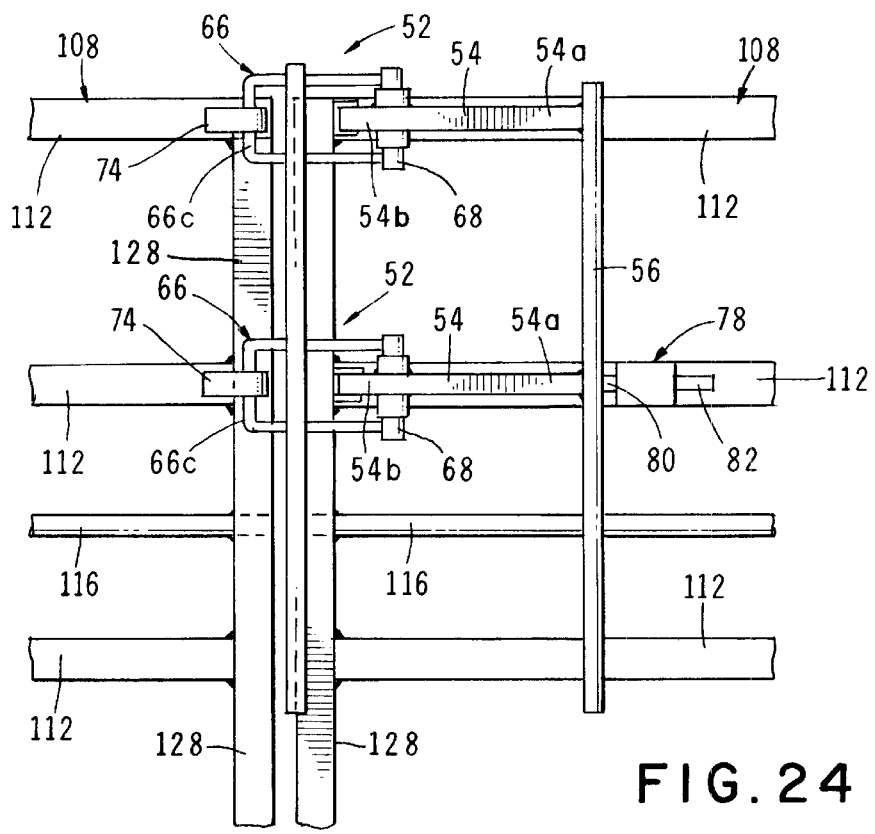
FIG. 24 is a fragmentary side elevational view of an alternate form of the gate construction shown in FIGS. 15A through 23 illustrating the use of a gate locking mechanism for locking together two sets of hingedly interconnected gates of the alternate construction shown in FIGS. 15A and 15B.

Turning next to FIG. 24 and alternate form of the apparatus of the invention is there shown. This alternate form of the invention is substantially identical in basic construction to that previously described, but includes connector means for releasably interconnecting together the side assemblies provided on each is side of the flatbed truck. The connector means is of the same general character as that described in connection with FIGS. 1 through 14 and like numerals are used in FIG. 24 to identify like components. As before, this connector means here comprises a pair of vertically spaced latching mechanisms 52 that are of an identical construction. Each of the latching mechanisms comprises a longitudinally extending lifting member 54 having first and second ends 54a and 54b respectively. Ends 54a of the lifting members of the two latching mechanisms are interconnected by a generally vertically extending, generally cylindrically shaped lifting bar 56. As was the case with the earlier described embodiment of the invention, a lifting force exerted on handle 56 will cause members 54 to pivot about the axis of a shaft 60 (see FIG. 6).

Connected to each of the members 54, for pivotal movement with respect thereto, is a generally U-shaped latching member 66. Latching members 66 are latchably interconnected with a hook-like clasp member 74 that is affixed to a vertically extending end post such as end post 128 of gate 108. As shown the FIG. 24, when the latching mechanism is in its latched position, bight portion 66c of latching member 66 is closely received within the channel portion 74a of clasp 74.

The operation of the connector means of this latest form of the invention is the same as previously described. More particularly, during operation an outward force exerted on lifting handle 56 will then cause members 54 to pivot into the outward position shown by the solid lines in FIG. 6. As the lifting members so pivot, latching member 66 will also pivot about the axis of shaft 68 permitting bight portion 66c to move outwardly of channel 74a of clasp 74 in the manner illustrated in FIG. 6. Once the latching member has cleared clasp 74, it can be moved in the direction of the arrow 87 of FIG. 6 into the position shown by the phantom lines in FIG. 6. In this position, it is apparent that the side gate assemblies 101 are free to move relative to each other in the manner illustrated in FIG. 25.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A side gate assembly for use with flatbed trucks having a bed having sides and a plurality of longitudinally spaced apart stake receiving pockets located along the sides of the bed, said side gate assembly comprising:

(a) a first gate having longitudinally spaced-apart end posts, at least one of said end posts having a hollow interior portion;

(b) a second gate hingedly connected to said first gate for swinging movement with respect thereto between a first position and a second position, said second gate having first and second slidably interconnected sections, said first section having a first end post hingedly connected to at least one of said end posts of said first gate and said second section having a second end post having a hollow interior portion; and (c) locking means carried by said second end post of said second section for locking said second gate in said first position, said locking means comprising a locking member having a first end, said first end being telescopically receivable within a selected stake receiving pocket, said locking member being telescopically movable within said hollow interior portion of said second end post of said second section from a first position wherein said first end of said locking member is disposed within said selected stake receiving pocket to a second position wherein said first end of said locking member is disposed outside of said selected stake receiving pocket.

2. The side gate assembly as defined in claim 1 in which said locking means comprises lifting means connected to said locking member for moving said locking member from said first position to said second position.

3. The side gate assembly as defined in claim 1 in which said first section has a plurality of longitudinally extending first tubular members and in which said second section has a plurality of longitudinally extending second tubular members, said second tubular members being telescopically receivable within said first tubular members.

4. The side gate assembly as defined in claim 3 in which said first section includes a vertically extending stop member having an opening therethrough and in which said second section includes a longitudinally extending stop member telescopically movable within the opening of said vertically extending member for movement between an extended position and a retracted position.

5. The side gate assembly as defined in claim 4 in which said longitudinally extending stop member includes a head portion engageable by said vertically extending stop member when said longitudinally extending stop member is in said extended position.

6. A side gate assembly for use with flatbed trucks having a bed having sides and a plurality of longitudinally spaced apart stake receiving pockets located along the sides of the bed, said side gate assembly comprising:

(a) a first gate having longitudinally spaced-apart end posts, at least one of said end posts having a hollow interior portion;

(b) a second gate hingedly connected to said first gate for swinging movement with respect thereto between a first position and a second position, said second side gate having:

(i) a first section having a first end post hingedly connected to at least one of said end posts of said first side gate and a plurality of longitudinally extending first tubular members; and (ii) a second section slidably interconnected with said first section and having a second end post having a hollow interior portion and a plurality of longitudinally extending second tubular members, said second tubular members being telescopically receivable within said first tubular members of said first section; and (c) locking means carried by said second end post of said second section for locking said second gate in said first position, said locking means comprising a locking member having a first end, said first end being telescopically receivable within a selected stake receiving pocket, said locking member being telescopically movable within said hollow interior portion of said second end post of said second section from a first position wherein said first end of said locking member is disposed within said selected stake receiving pocket to a second position wherein said first end of said locking member is disposed outside said selected stake receiving pocket.

7. The side gate assembly as defined in claim 1 in which said locking means comprises lifting means connected to said locking member for moving said locking member from said first position to said second position.

8. The side gate assembly as defined in claim 6 in which said first section includes a vertically extending stop member having an opening therethrough and in which said second section includes a longitudinally extending stop member telescopically movable within the opening of said vertically extending member for movement between an extended position and a retracted position.

9. The side gate assembly as defined in claim 8 in which said longitudinally extending stop member includes a head portion engageable by said vertically extending stop member when said stop member is in said extended position.

10. A pair of side gate assemblies for use with flatbed trucks having a bed having a side and a plurality of longitudinally spaced apart stake receiving pockets located along the sides of the bed, each of the pair of side gate assemblies comprising:

(a) a first gate having longitudinally spaced-apart end posts, at least one of said end posts having a hollow interior portion;

(b) a second gate hingedly connected to said first gate for swinging movement between a first position and a second position, said second gate having:

(i) a first section having a first end post hingedly connected to at least one of said end posts of said first gate and a plurality of longitudinally extending first tubular members; and (ii) a second section slidably interconnected with said first section and having a second end post having a hollow interior portion and a plurality of longitudinally extending second tubular members, said second tubular members being telescopically receivable within said first tubular members of said first section; and (c) locking means carried by said second end post of said second section for locking said second gate in said first position, said locking means comprising:
  (i) a locking member having a first end, said first end being telescopically receivable within a selected stake receiving pocket, said locking member being telescopically movable within said hollow interior portion of said second end post of said second section from a first position wherein said first end of said locking member is disposed within said selected stake receiving pocket to a second position wherein said first end of said locking member is disposed outside said selected stake receiving pocket; and
  (ii) lifting means connected to said locking member for moving said locking member from said first position to said second position; and (d) connector means carried by said pair of gate assemblies for releasably interconnecting together said pair of gate assemblies.

11. The pair of side gate assemblies as defined in claim 10 in which said first section of each of said second gate includes a vertically extending stop member having an opening therethrough and in which said second section of each said second gate includes a longitudinally extending stop member telescopically movable within the opening of said vertically extending member for movement between an extending position and a retracted position.

12. The pair of side gate assemblies as defined in claim 10 in which said connector means comprises a latching mechanism including:

(a) a lifting member having first and second ends, said lifting member being pivotally connected to a selected one of said second gates of said pair of side gate assemblies for movement between a locked position to an unlocked position;

(b) a latching member pivotally connected to said lifting member intermediate said first and second ends thereof, said latching member being movable from a latching position to an unlatched position upon said lifting member being moved to said unlatched position; and (c) a clasp affixed to the other of said second gates of said pair of side gate assemblies, for engagement with said latching member when said latching member is in said first latching position.

13. The side gate assembly as defined in claim 12 in which said latching mechanism comprises a generally U-shaped member having spaced apart sides and a bight portion interconnecting said sides.

14. The side gate assembly as defined in claim 13 in which said clasp of said latching mechanism includes generally vertically extending channel, said bight portion of said generally U-shaped member being receivable within said channel when said latching member is in said latching position.

15. The side gate assembly as defined in claim 13 in which said latching mechanism further includes:

(a) a generally tubular shaped member connected to said lifting member; and (b) a pin disposed within said tubular shaped member for rotation therewithin, said pin being connected to said spaced apart sides of said latching member.

* * * * *